Figure 3:
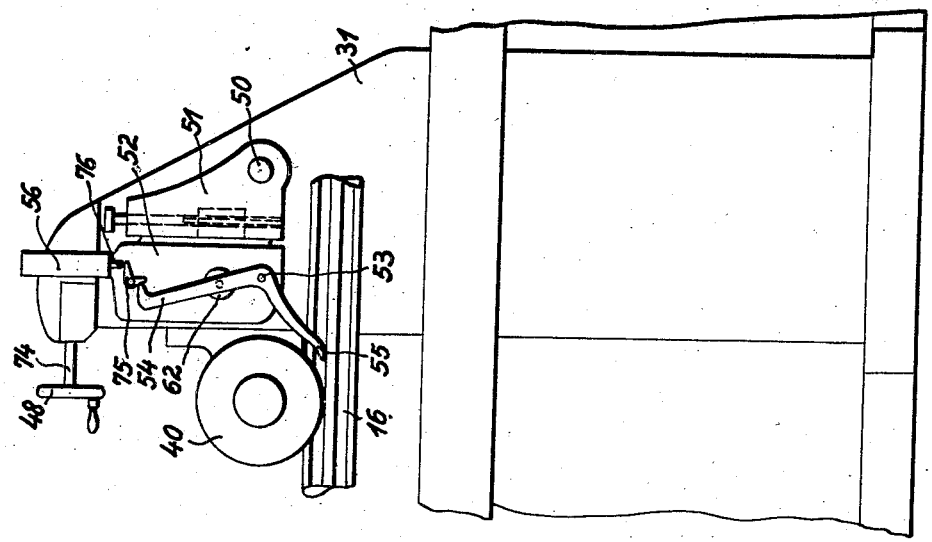

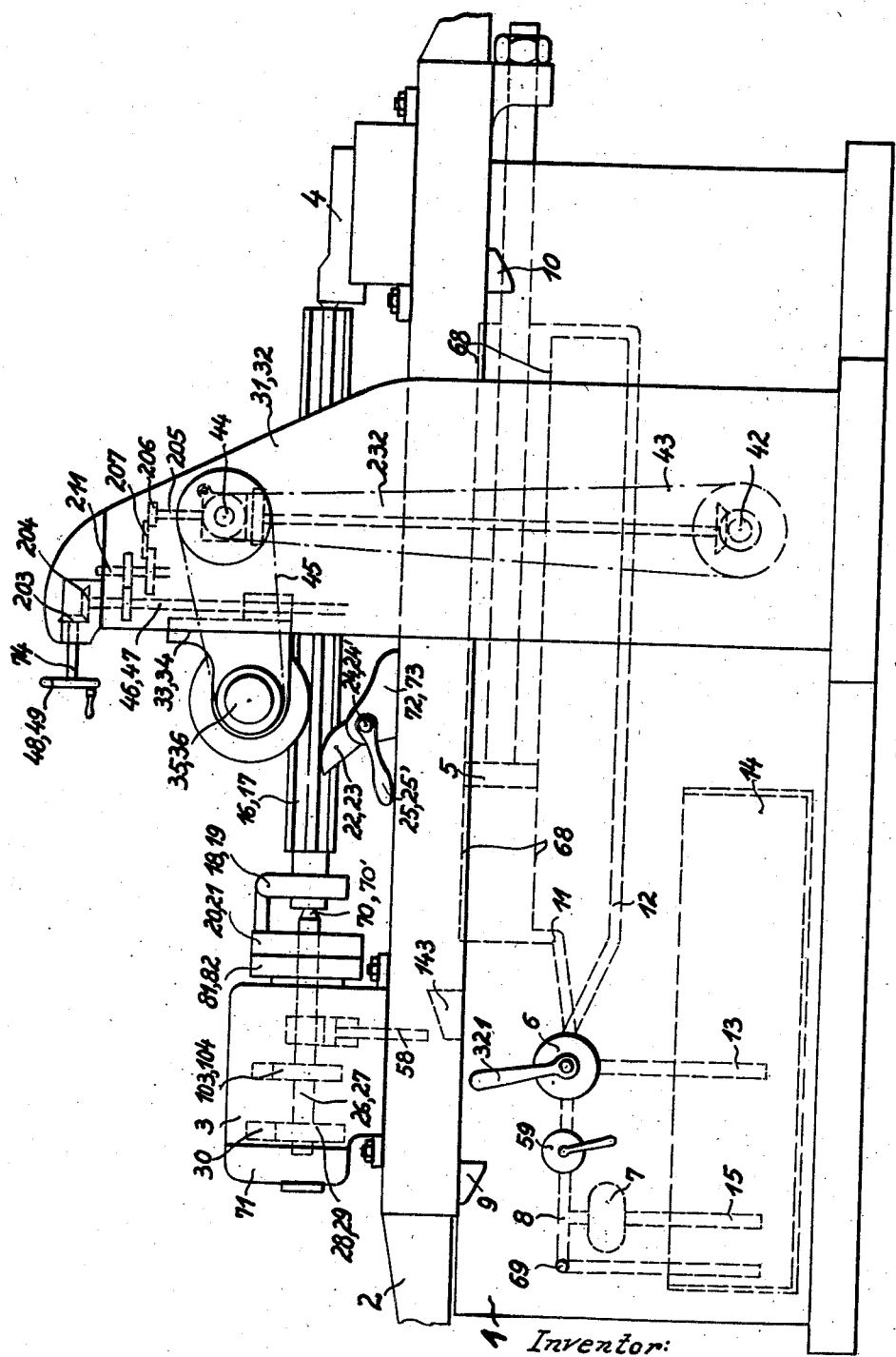

March 22, 1932. C. JUNGE 1,850,799
GRINDING MACHINE, PARTICULARLY FOR SPLINE SHAFTS
Filed July 7, 1931 14 Sheets-Sheet 2

Inventor: Claus Junge
Attorney:

March 22, 1932.  C. JUNGE  1,850,799
GRINDING MACHINE, PARTICULARLY FOR SPLINE SHAFTS
Filed July 7, 1931  14 Sheets-Sheet 3

Inventor:
Claus Junge
Attorney:

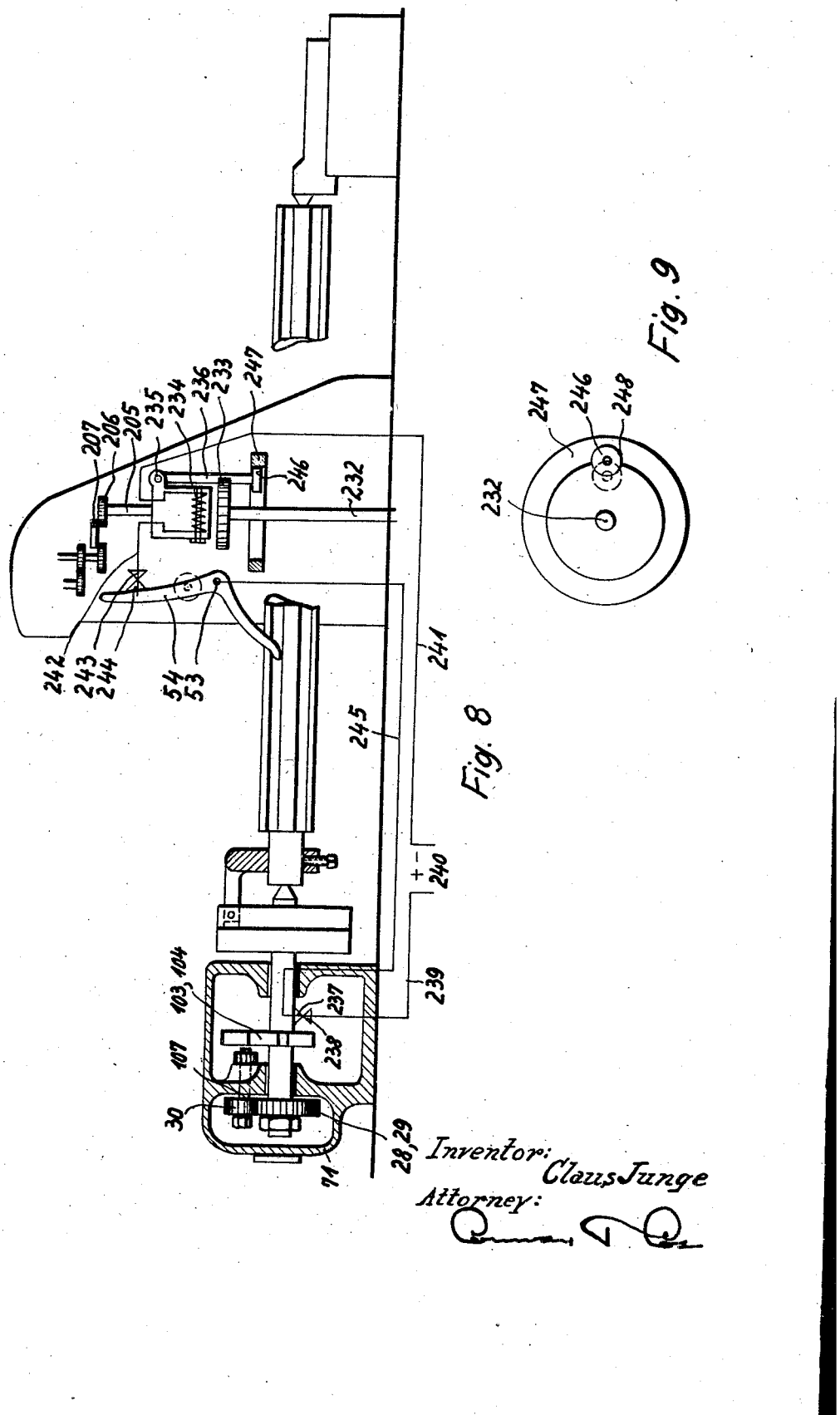

March 22, 1932. C. JUNGE 1,850,799
GRINDING MACHINE, PARTICULARLY FOR SPLINE SHAFTS
Filed July 7, 1931 14 Sheets-Sheet 5
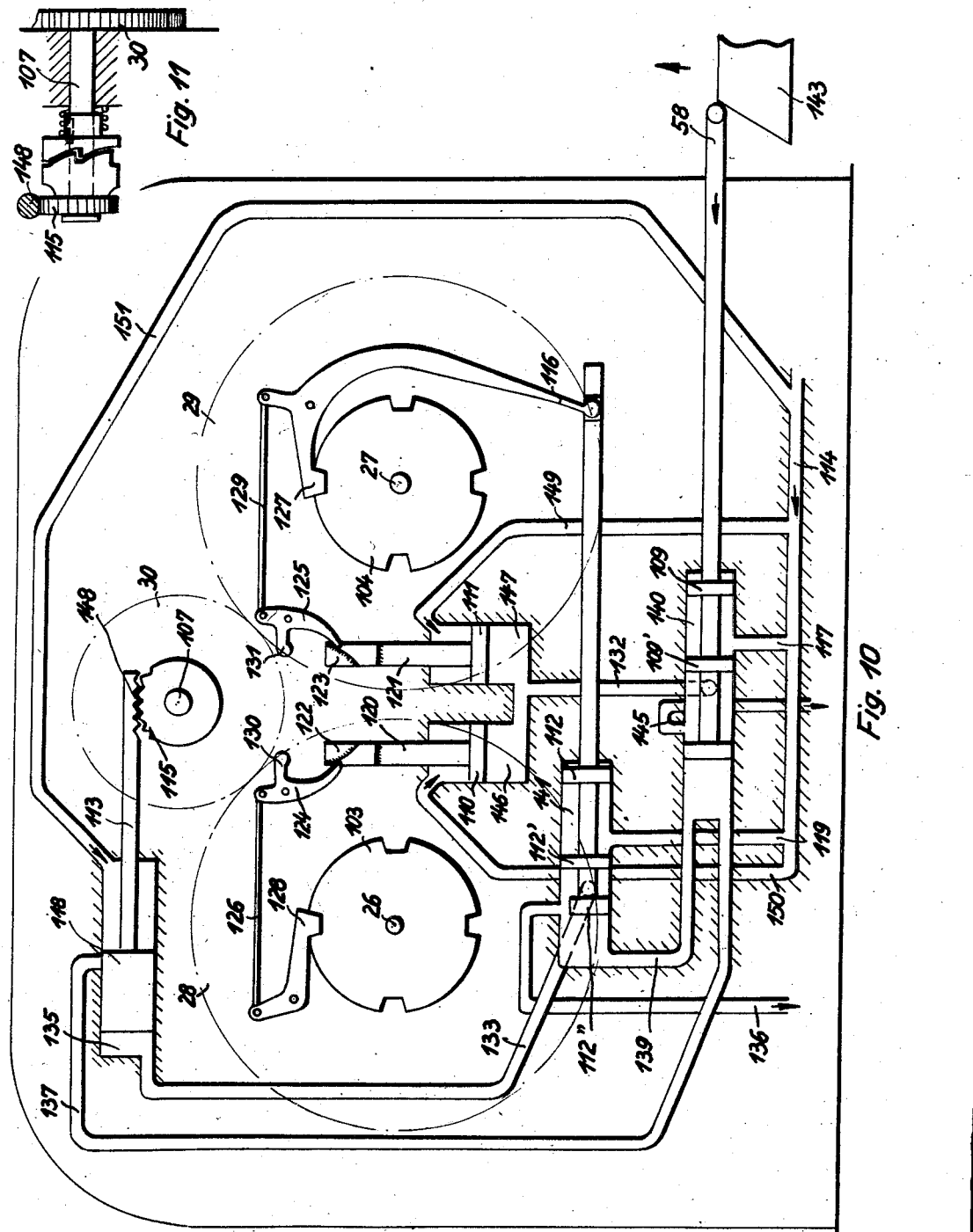

March 22, 1932.   C. JUNGE   1,850,799
GRINDING MACHINE, PARTICULARLY FOR SPLINE SHAFTS
Filed July 7, 1931   14 Sheets-Sheet 7

Inventor:
Claus Junge
Attorney:

Inventor:
Claus Junge
Attorney

March 22, 1932. C. JUNGE 1,850,799
GRINDING MACHINE, PARTICULARLY FOR SPLINE SHAFTS
Filed July 7, 1931 14 Sheets-Sheet 9
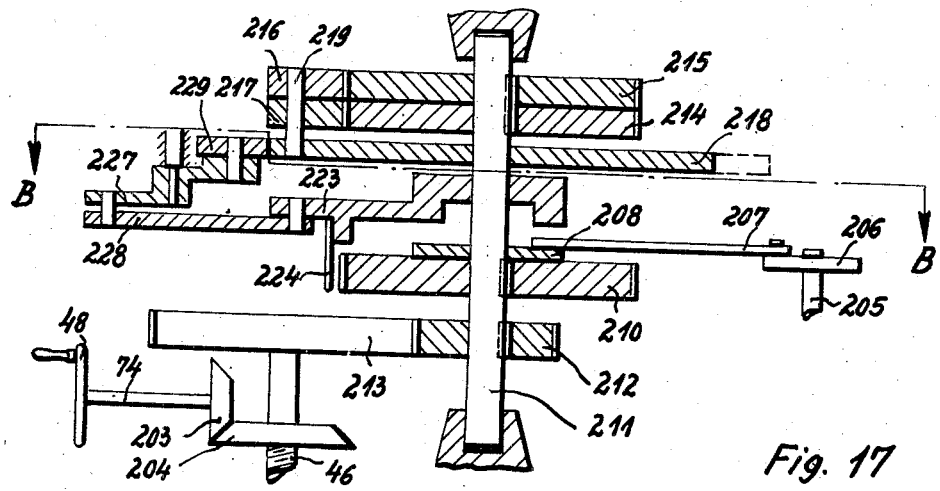
Fig. 17
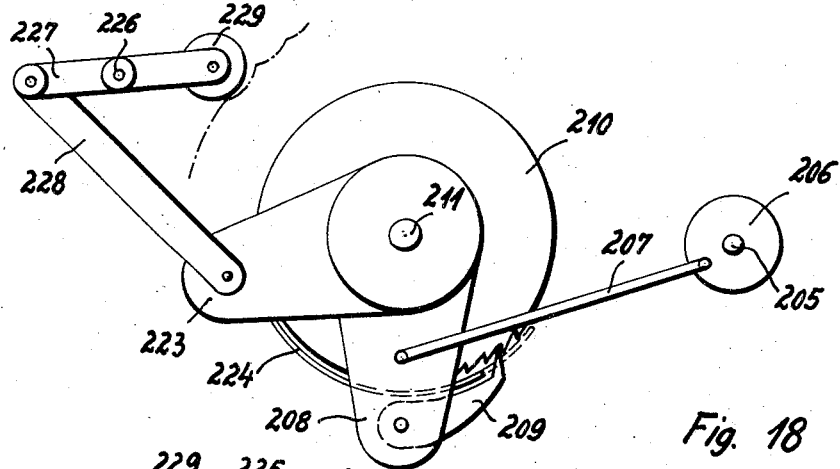
Fig. 18
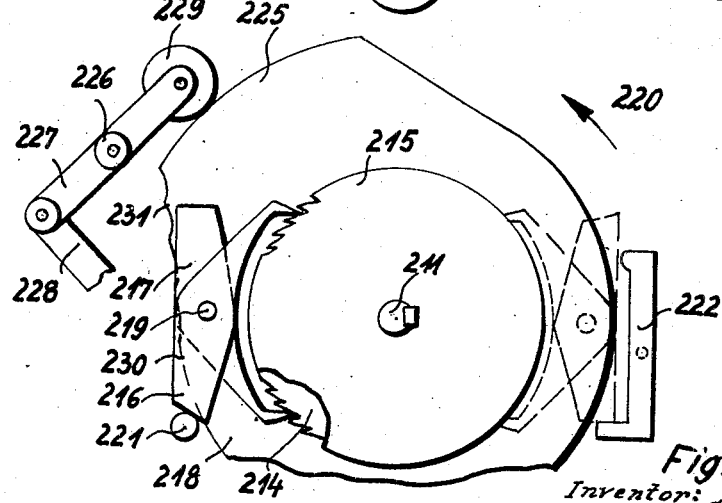
Fig. 19
Inventor: Claus Junge
Attorney: 

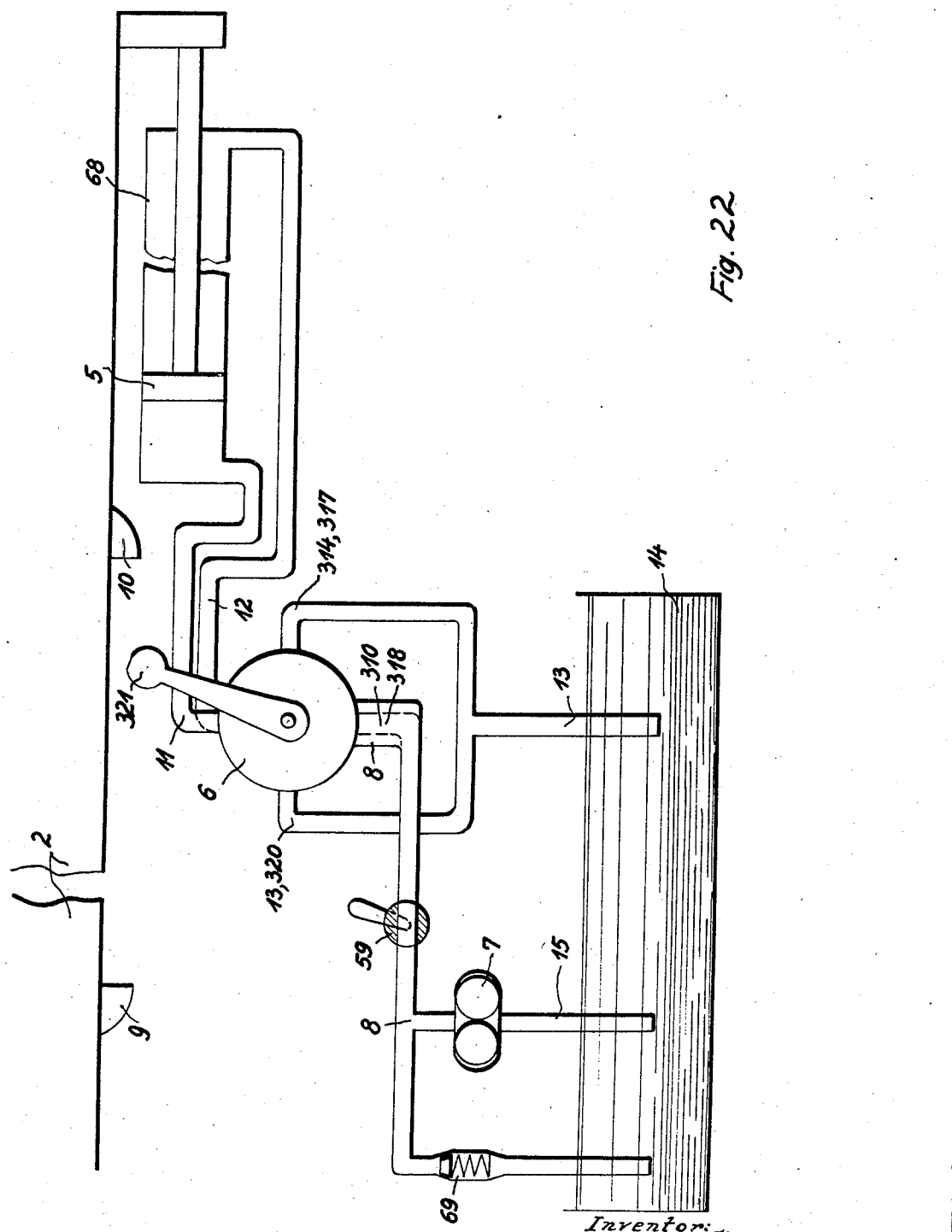

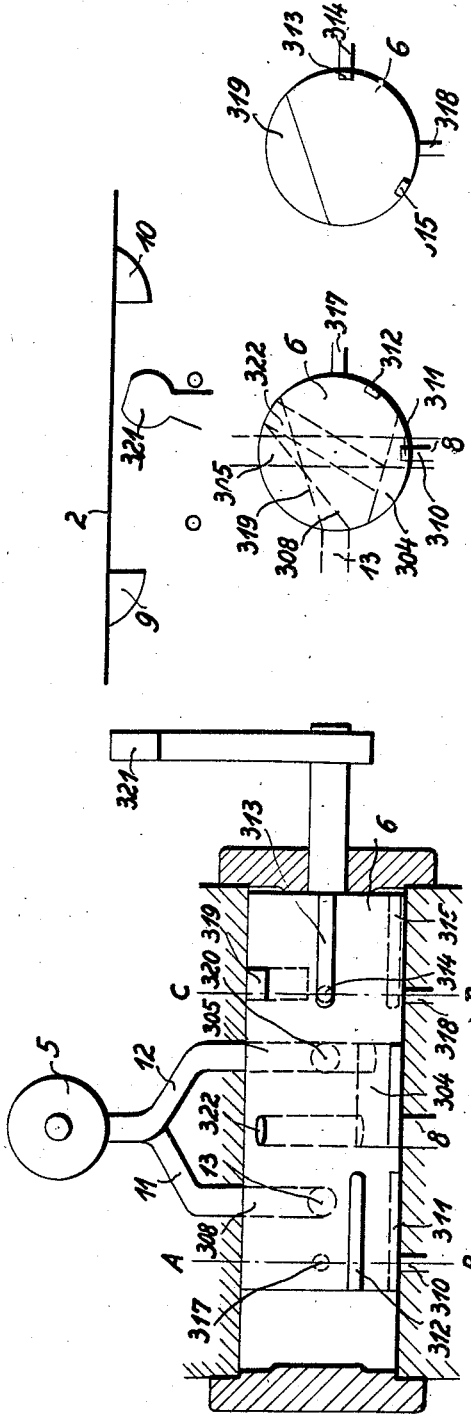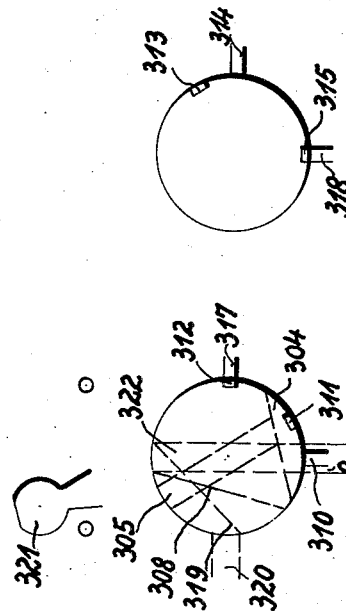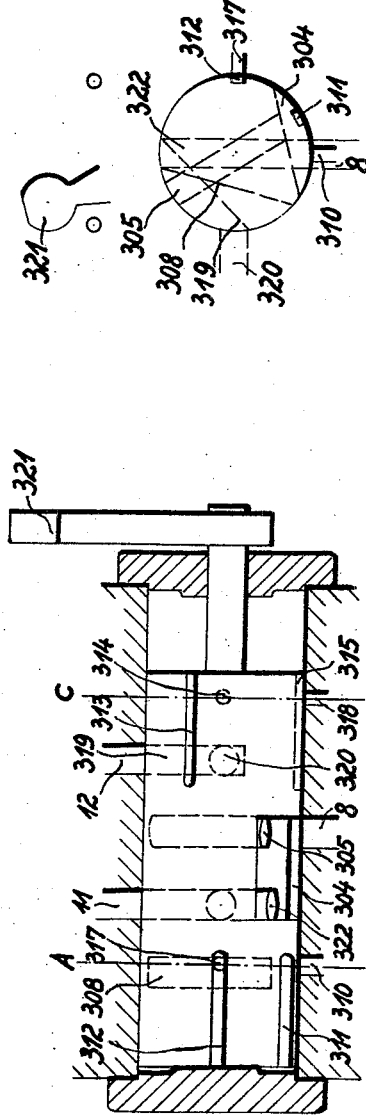

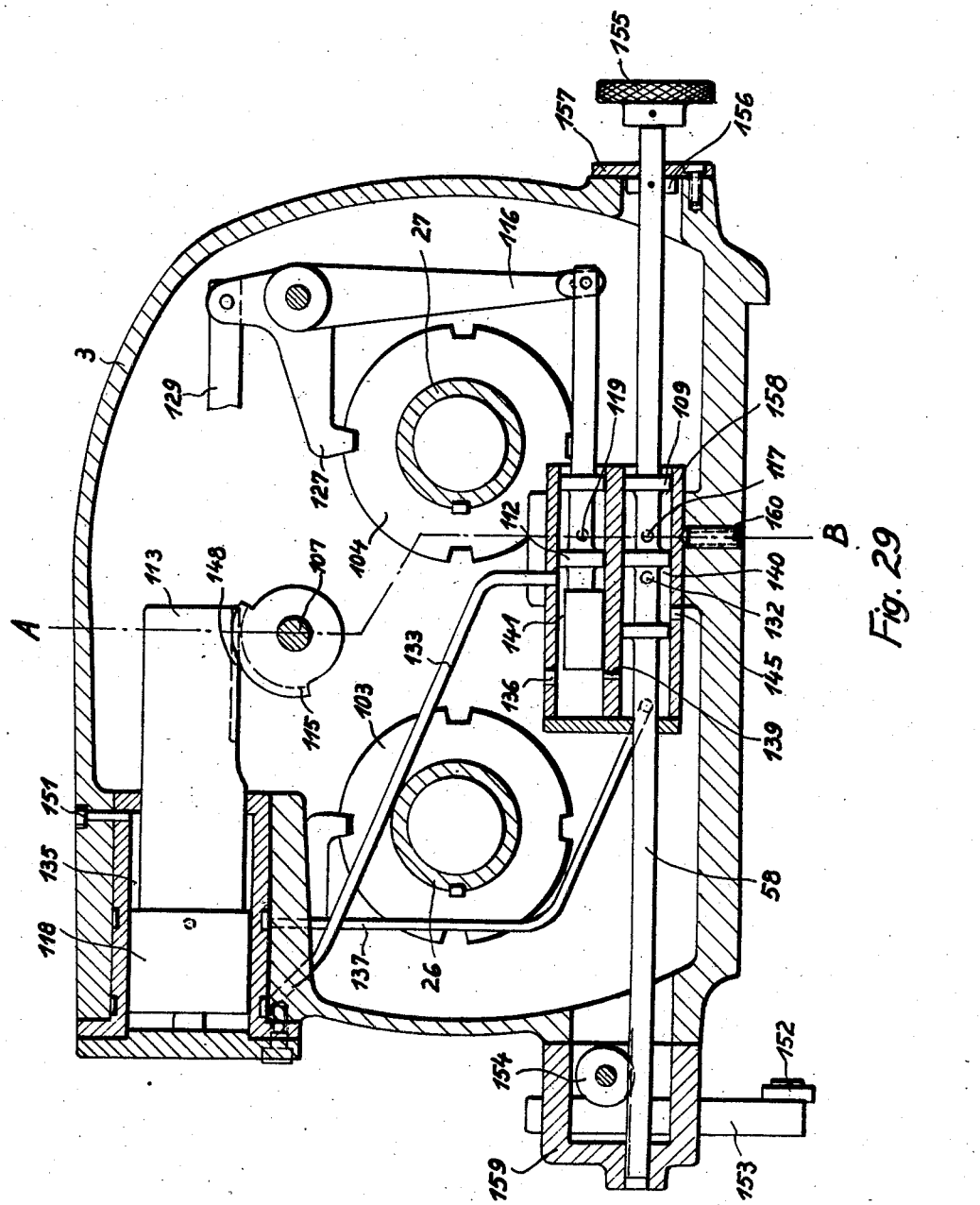

March 22, 1932. C. JUNGE 1,850,799
GRINDING MACHINE, PARTICULARLY FOR SPLINE SHAFTS
Filed July 7, 1931 14 Sheets-Sheet 14

Inventor:
Claus Junge
Attorney:

Patented Mar. 22, 1932

1,850,799

UNITED STATES PATENT OFFICE

CLAUS JUNGE, OF BERLIN-MARIENFELDE, GERMANY, ASSIGNOR TO FRITZ WERNER AKTIENGESELLSCHAFT, OF BERLIN-MARIENFELDE, GERMANY

GRINDING MACHINE, PARTICULARLY FOR SPLINE-SHAFTS

Application filed July 7, 1931, Serial No. 549,238, and in Germany August 10, 1929.

My invention relates to grinding machines and, more particularly, to machines for grinding so-called spline-shafts, as are used, for instance, in selective shift gears for automobiles, and has for its object to render the grinding operation cheaper and simpler.

Another object of my invention is to provide a machine of the type indicated which is adapted to grind spline-shafts in a shorter period than possible heretofore and to perform the grinding operation entirely automatically.

Other objects of my invention will appear from the description of a preferred embodiment following hereinafter and the features of novelty will be pointed out in the appended claims.

For the purposes of my invention, I provide the machine with two work-carrying spindles arranged parallel to the direction of the reciprocatory motion of the grinder carriage and positively geared to one another by the gears of an automatic dividing and indexing head. A shaft carrying a grinding disc is coordinated to either work-carrying spindle, said shaft extending perpendicularly to the work-carrying spindle and adapted to be advanced towards the work piece.

The advantages flowing from this arrangement are the following: Two spline-shafts may be inserted in the machine, one clamped to each spindle, and the bottom between adjacent splines of one shaft may be ground, while at the same time two flanks of the splines of the other shaft are being ground; the machine may also be used, if it should be desired, to leave the ground of the spline-shafts unfinished. In this case, two spline-flanks of each shaft are ground simultaneously. This simultaneous operation on two work pieces permits to reduce the period of operation per piece to half of the time which would be required otherwise.

Owing to the operative connection of both spindles provided for by the fully automatic dividing and indexing head adapted to be set for different numbers of splines, a proper position of the work pieces will be obtained during the completion of the grinding operation so that the time-consuming job of setting the machine need not be carried out but for the first piece of a series. Suitable driving discs will be easily and rapidly attached to the spindles in proper position by use of gauging means described hereinafter which I have provided for the machine and which permits the work piece to be transferred from one spindle to the other without necessitating any readjustment of the driving disc, as the latter and the work piece carried thereby will automatically resume the proper position on the other spindle. It will easily be appreciated that the time required for adjustment of the work piece in the machine is thus greatly reduced.

Upon each complete revolution of the work pieces, the grinding discs are automatically advanced and this intermittent advance is continued until the total advance has been reached which is required for obtaining the desired dimensions of the finished work piece and depends also on the wear of the grinding discs. I may provide sensing elements adapted to contact with the work pieces and to automatically disable the grinding discs as soon as the desired dimensions of the work pieces have been obtained.

The sensing elements may preferably control an indicator, for instance a pointer on a scale, which will render visible the progress of the grinding operation at any time. The grinding discs for finishing the ground, or the spline-flanks respectively, need not be exchanged if the machine operates to grind on the work piece carried by one spindle the ground only and on the work piece carried by the other spindle two flanks only.

Owing to the construction and operation of my novel machine, the spline-shafts are ground with the highest accuracy required in work pieces of this nature, and the operation is so simplified that the period required for finishing one shaft is reduced to about ⅓ to ¼ of the time required in the machines known prior to my invention.

Further details of my invention will appear from the following description of an embodiment which is shown in the accompanying drawings.

Figure 2:
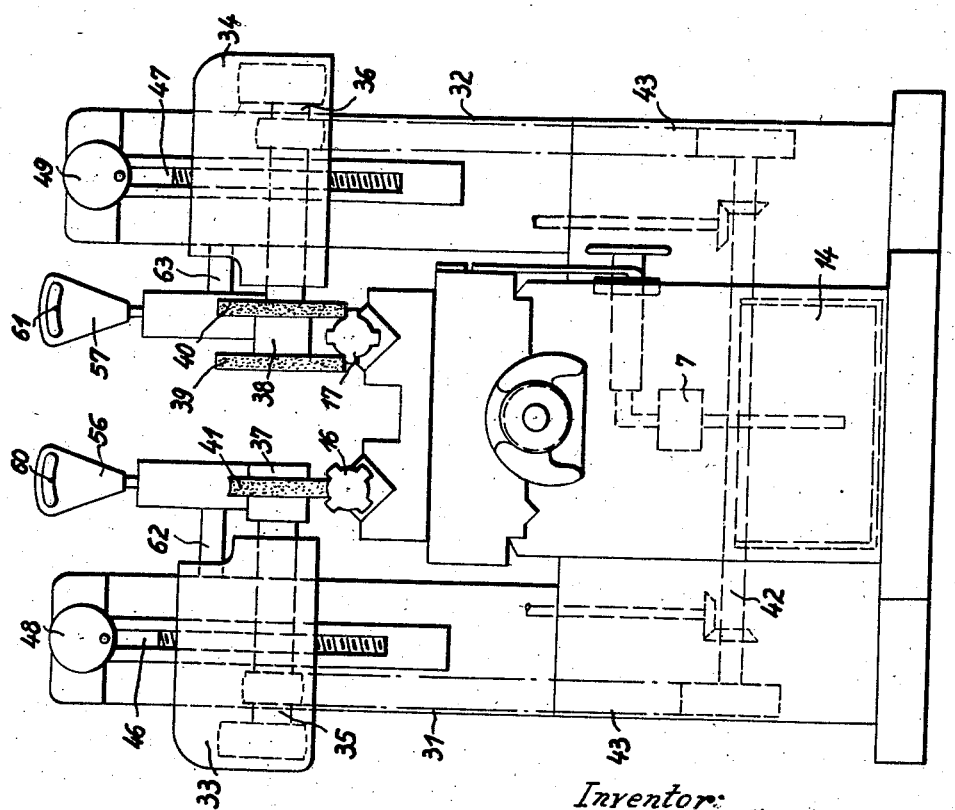
Figure 5:
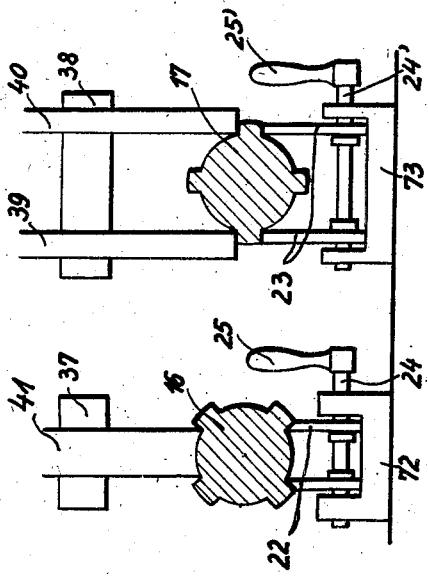
Figure 7:
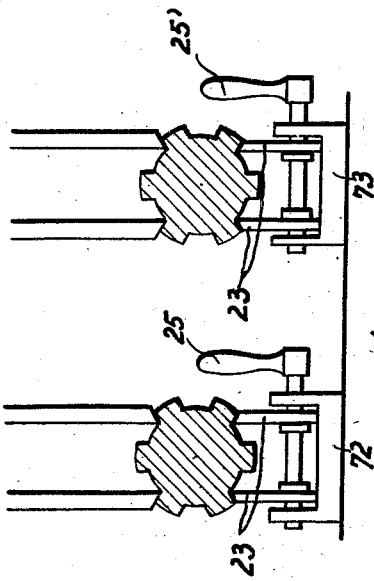
Figure 4:
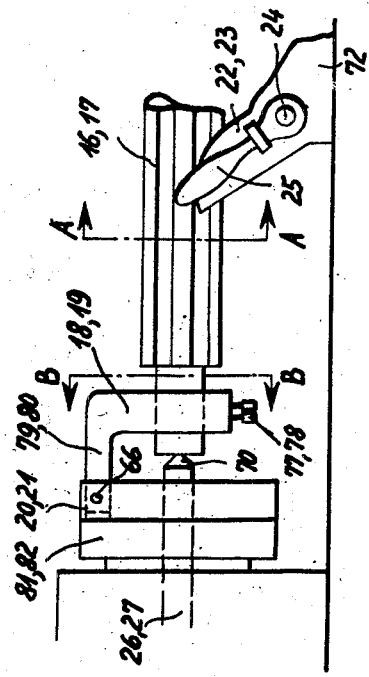
Figure 6:
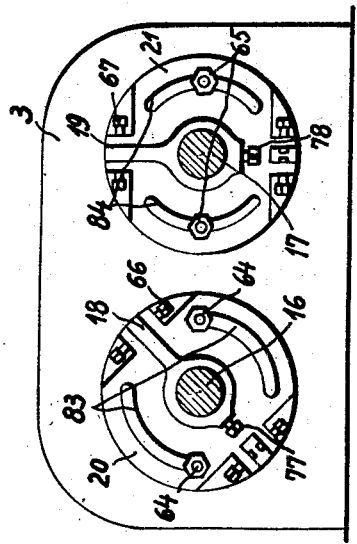
Figure 12:
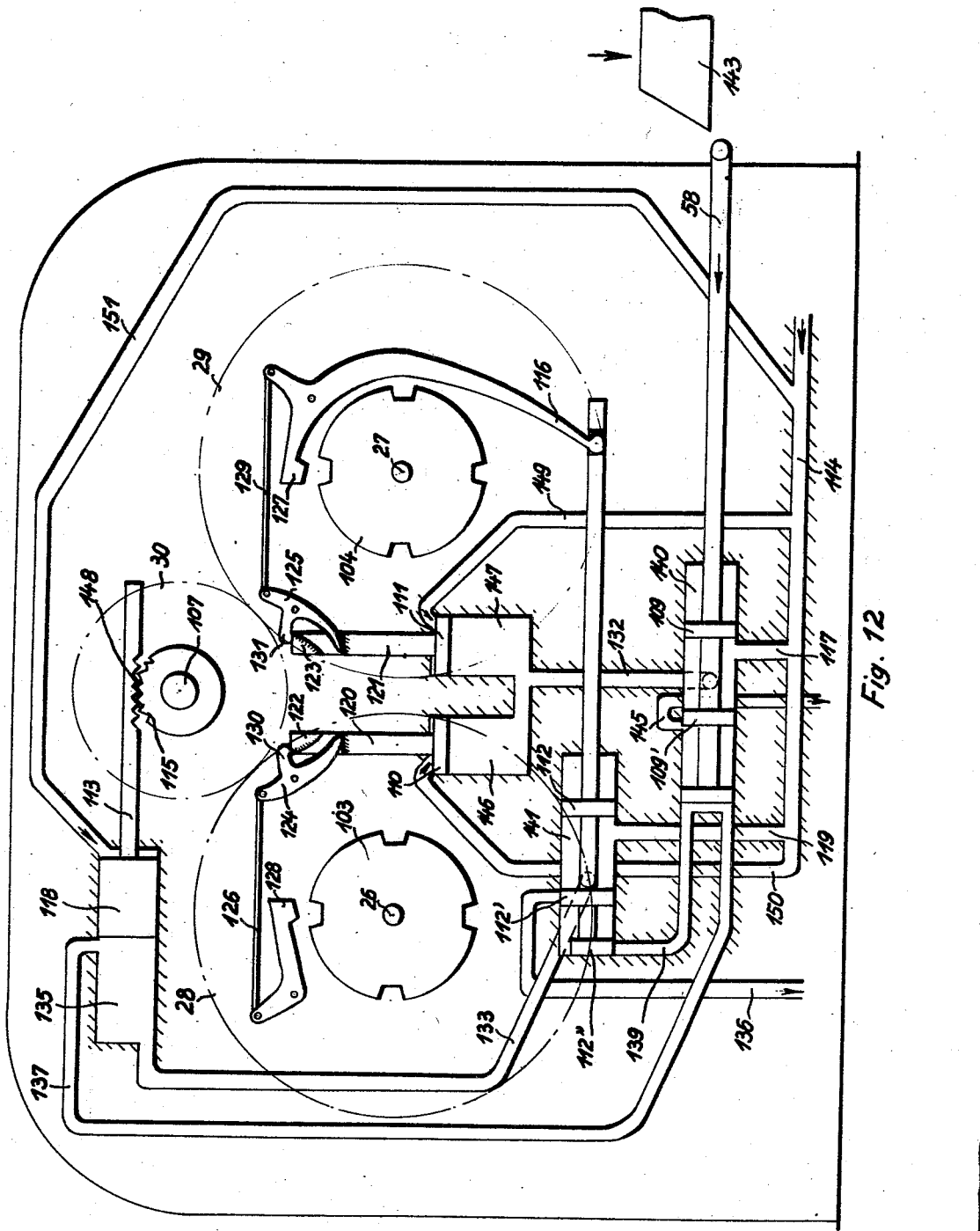
Figure 13:
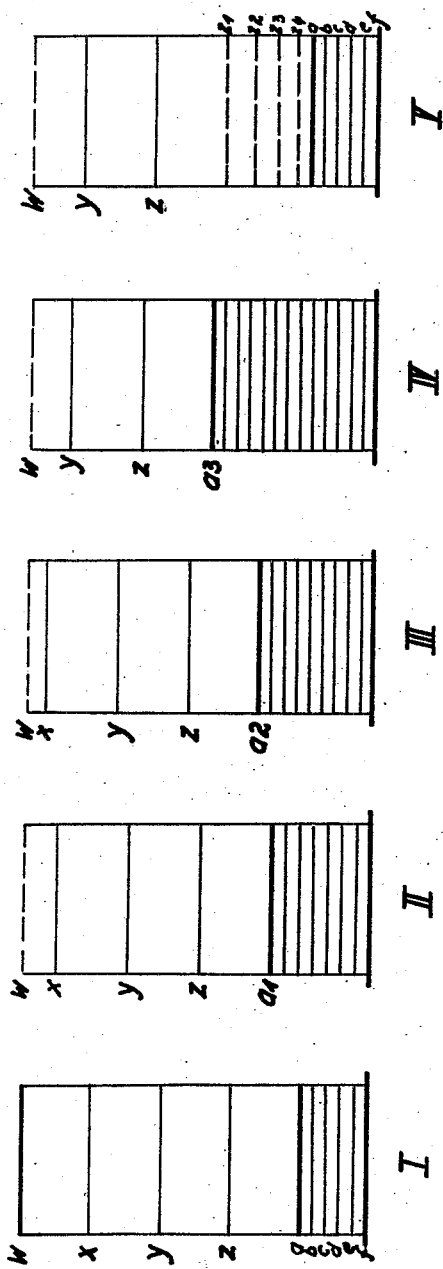
Figure 14:
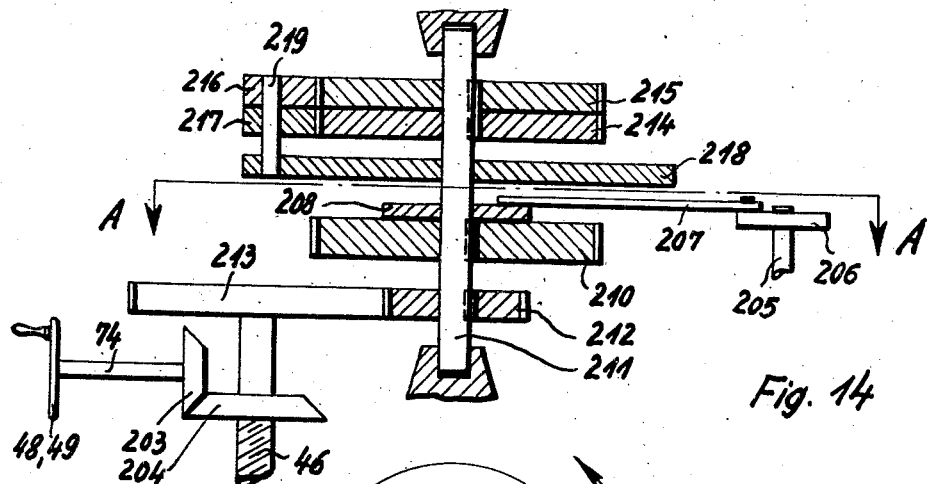
Figure 15:
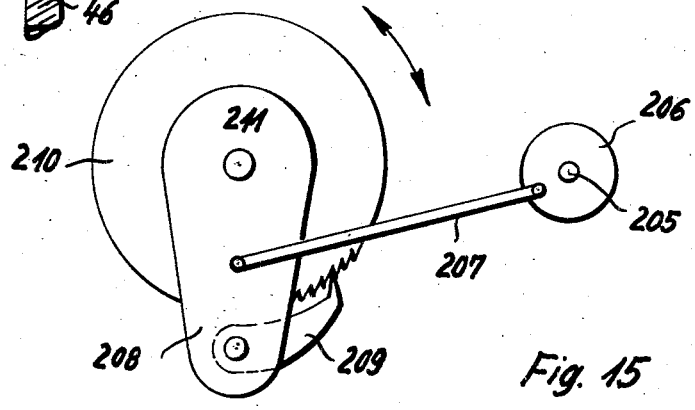
Figure 16:
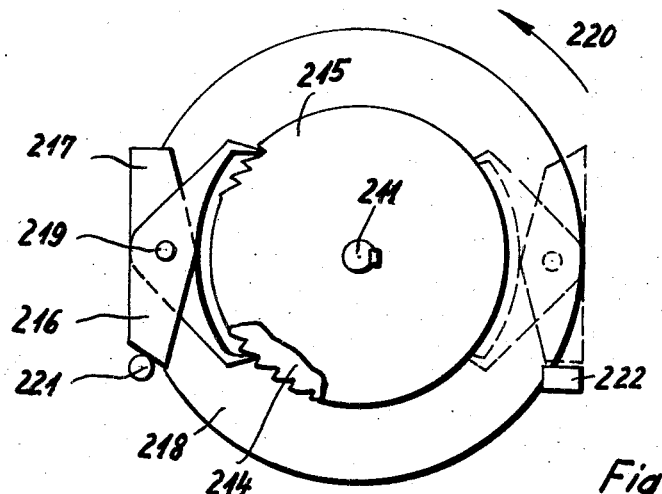
Figure 20:
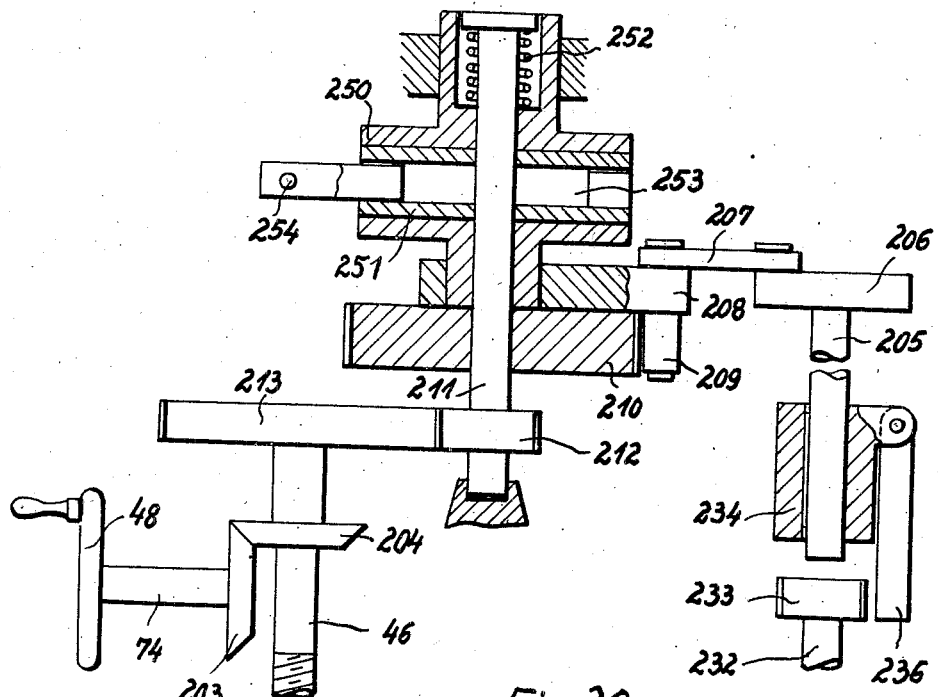
Figure 21:
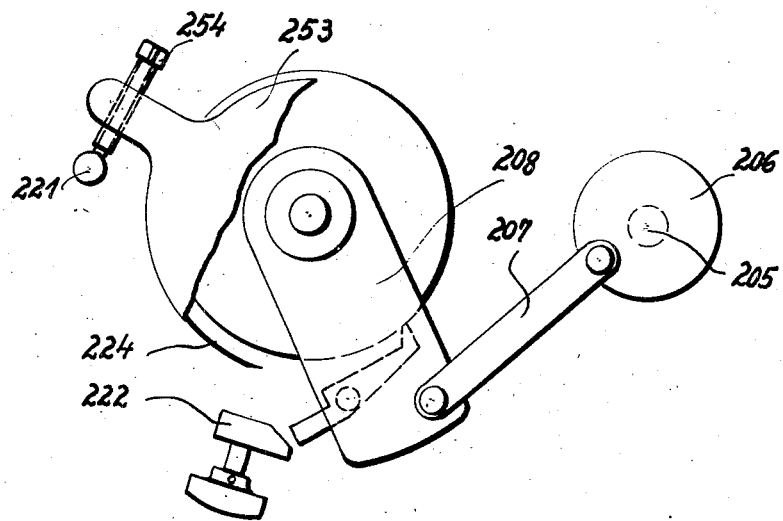
Figure 31:
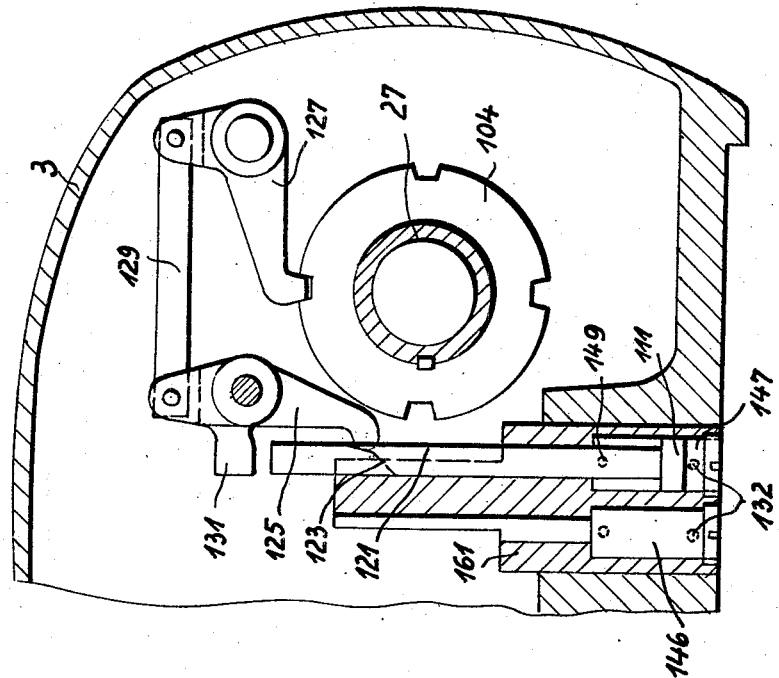
Figure 30:
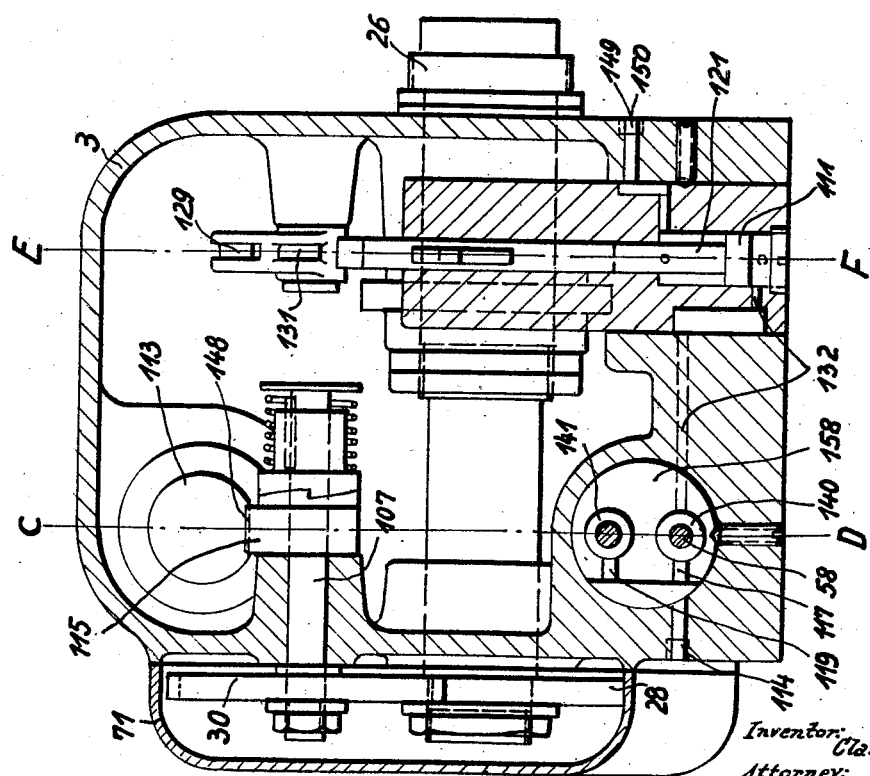

Fig. 1 is an elevation of the machine,

Fig. 2 an end elevation, the indexing head being omitted,

Fig. 3 a partial elevation of the machine, a standard of the frame being omitted, Fig. 4 an elevation of the means for attaching the work piece and the gauging means for setting the same, Fig. 5 the section along the line A—A of Fig 4, viewed from the left, Fig. 6 the section along the line B—B of Fig. 4 viewed from the right, Fig. 7 a view similar to Fig. 5 illustrating another operation of the machine, Fig. 8 a partial elevation of the machine illustrating parts of the indexing head, a sensing element and the means controlled thereby for advancing the grinding disc, Fig. 9 a plan-view of details shown in Fig. 8, Figs. 10 and 12 show the automatic indexing head in a diagrammatic fashion, the parts being shown in consecutive positions in these figures, Fig. 11 is a section along the shaft 107 shown in Figs. 10 and 12, Figs. 13–21 illustrate the operation of the advancing means, Fig. 13 being a diagram of a comparison of the operation with and without a compensation of the wear of the grinding discs, Fig. 14 is an axial section through the gearing for the right advance, Fig. 15 a cross-section along the line A—A of Fig. 14, Fig. 16 a top-view of Fig. 14, Fig. 17 is an axial section through the gearing for a rough advance and a subsequent fine advance of the grinding shafts, Fig. 18 is the section along line B—B of Fig. 17, Fig. 19 is a top-view of Fig. 17, some of the parts being omitted, Fig. 20 is an axial section through a modified form of the gearing shown in Fig. 17, Fig. 21 is a top-view of Fig. 20, Fig. 22 illustrates the fluid-operated controlling means for the machine, Fig. 23 is an axial section of the rotary slide valve controlling the carriage-operating pressure fluid, Fig. 24 is a cross-section taken along line A—B of Fig. 23, Fig. 25 is a cross-section taken along line C—D of Fig. 23, Fig. 26 is a view similar to Fig. 23 showing the parts in a different position, Fig. 27 is a section taken along line A—B of Fig. 26 and Fig. 28 is an axial section taken along line C—D of Fig. 26, Figs. 29–31 illustrate the indexing head embodying the action diagrammatically shown in Figs. 10 and 12, Fig. 29 being a cross-section taken along the line C—D of Fig. 30, Fig. 30 a longitudinal section taken along the line A—B of Fig. 29, and Fig. 31 a partial section taken along line E—F of Fig. 30. The reference numerals in Figs. 29–31 designate the same parts as those used in Figs. 10 and 12.

On the bed 1 of the frame, the table 2 is suitably guided which carries at its front the dividing and indexing head 3 for two spindles and at its rear end the tailstock 4 provided with two centers.

The reciprocatory motion of the table is preferably effected by a hydraulic piston 5 cooperatively connected with the table and arranged for reciprocatory movement in a cylinder 68 mounted in the bed of the machine. The movement of the piston is controlled by a rotary slide valve 6, the operation of which will be later described with reference to Figs. 22–28. The operating fluid, such as oil, is supplied to the control valve 6 through a pipe 8 by the pump 7 which receives the fluid from a tank 14 arranged within the bed of the machine. The valve 6 is controlled by stops 9, 10 carried by the table 2 and causes the controlling fluid to be alternately conducted through pipes 11, or 12 respectively, to the ends of the cylinder 68 to operate the piston 5 movable therein. The pressure liquid returns through pipe 13 to the tank 14 from which it will be recirculated through pipe 15 by the pump 7. A throttle valve 59 is adapted to adjust the cross-section of the passage for the controlling fluid and thus serves for regulating the speed of the table. The surplus of the operating fluid is returned to the tank 14 by an overflow valve 69.

The dividing and indexing head 3 and the tailstock 4 are longitudinally guided on the table 2 and adapted to be fixed in any desired position by suitable bolts. The indexing head carries the two work-spindles 26 and 27 which are journalled in the front and the rear walls of the head. The two centers of the tailstock 4 project in a direction parallel to the axis of the two work-spindles and are adapted to be moved towards the rear for inserting the work pieces 16 and 17 and to be subsequently moved forward in an automatic manner, for instance by springs.

The two work-spindles 26, 27 (Figs. 1, 4, 8) project through the front wall of the head 3 and are each provided with a tapered end 70, or 70' respectively, and with a driving disc 20, or 21 respectively, which is rotatably mounted on the spindle and adapted to be fixed thereto. These driving plates serve for the attachment of the work pieces 16, or 17 respectively, in a manner which will be described later. A shaft 107 is journalled in the indexing head 3 which extends parallel to the work spindles and carries an exchangeable gear 30 (Figs. 8, 10, 12). This gear meshes with two gears 28 and 29 mounted on the rear ends of the work-spindles 26, 27. For exchanging the three gears, access may be had to the same upon detaching a cover 71 removably arranged on the rear wall of the head 3. The gear 30 serves to transmit motion to the two gears 28, 29 and is automatically and intermittently turned through a predetermined invariable angle, whenever the table 2 has completed a reciprocation, as will be described later.

The driven gears 28, 29 are automatically locked and will be automatically and temporarily released prior to any indexing operation. The interchangeable gears 28, 29, 30 are so chosen as to give the ratio of transmission which is required for turning the work-spindle in accordance with the number of splines of the work piece to be ground. If the shafts have four splines, a turn through 90° is required, or in event of six splines the turn amounts to 60°.

In the dividing and indexing head 3 (Figs. 10 and 12) the spindles 26, 27 are released for operation any time, the table has arrived in its left end position and the operation must be completed before the grinding discs are restored to engagement with the work pieces upon the reversal of the table. The operation of the spindles 26, 27 is initiated by a stop 143 (Figs. 1 and 10) which is attached to the bed 1 of the machine and adapted to engage a counter-stop 58 mounted on the rear of the indexing head (Fig. 10), when the table carrying the head approaches its left end position.

For sake of a better illustration, the arrow indicating the direction of movement of the table and the stop 143 are shown in Fig. 10 as situated in the plane of the drawings, as distinguished from Fig. 1.

I prefer to effect the cooperation of the stops 143 and 58, the releasing, the turning and the locking of the work-spindles 26 and 27 by a suitable controlling fluid, such as a pressure liquid. This operation permits of automatically restoring all of the parts to their initial position, when the whole cycle of operation has been completed.

For this purpose, I have devised fluid-operated dividing and indexing means which are embodied in the head 3 (Fig. 8) and will be described hereinafter with reference to Figs. 10 and 12. Fig. 10 illustrates the parts in the position in which the spindles are locked, whereas Fig. 12 shows the position upon completion of the turn, just before the locking levers have been restored to locking position.

As a great number of borings and channels is provided for conducting the operating fluid, all situated in different planes and at various angles to each other, it would be difficult or impossible to comprehensively explain the operation with reference to drawings showing the practical construction of the device. For this reason, I have illustrated the device in Figs. 10 and 12 in a diagrammatic fashion which shows the various parts and channels as situated in the same sectional plane.

The fluid-operated indexing device comprises a cylinder 140 to which the pressure liquid is supplied from tank 14 through channels 114, 117 by means of a suitable pump (not shown) in these figures. The piston 109 guided in the cylinder 140 is adapted to be moved in the one direction, to wit from the right towards the left, by engagement of the stop 143 on the table with the counterstop 58 attached to the piston rod. Another cylinder 141 is supplied with the pressure oil through a boring 119. A piston 112 guided in the second cylinder may be moved by an extension 116 of a locking lever 127 which serves for locking the work-spindle 27 in accurate position. The cylinder 140 communicates through a boring 132 with the lower ends of two cylinders 146 and 147 in which two pistons 110 and 111 are movable.

Rods 120 and 121 connected with these pistons have inclined cam faces 122 and 123 adapted to engage levers 124 and 125 and to turn the former in clockwise direction and the latter in anti-clockwise direction, when the pistons are lowered. By means of connection rods 126 and 129, the turn of levers 124 and 125 causes the locks 127 and 128 to be firmly pressed into suitable recesses provided in discs 103, 104 whereby the work spindles will be locked in accurate position. When the piston rods move in upward direction, first the cam faces 122, 123 will release the levers 124 and 125 and, later, the heads of the piston rods engage the arms 130, 131 of the levers and turn the same so as to lift the locks out of the recesses provided in the periphery of the locking discs 103, 104.

The two locking or indexing discs 103 and 104 are non-rotatably and detachably mounted on the two work-spindles 26 and 27 so that they may easily be exchanged and replaced by discs having another number of locking recesses. Instead of arranging the indexing discs interchangeably, I may mount a number of such discs on each shaft in juxtaposition, the numbers of recesses in said discs corresponding to various customary numbers of splines. In this case, I provide for axial movement of the locking pawls relative to the locking discs so that the locking pawls may cooperate with any selected disc which is moved to cooperative position and suitably arrested therein. Moreover, the locking shafts carry the change gears 28, 29 which mesh with the gear 30 mounted on a shaft 107 of the indexing head as explained.

The pressure oil is conducted from the second controlling cylinder 141 through a channel 133 to the left-hand side of the cylinder 135 in which a piston 118 is movable. The latter carries a rod 113 provided with lateral teeth 148 (Fig. 11) meshing with a toothed sector 115. This sector is rotatably mounted on the shaft 107 and adapted to impart rotation to the same by a suitable one-way clutch in clockwise direction. When the piston 118 returns to its left end position, however, the shaft 107 will not be turned by the rack 148.

The pressure oil pump (not shown) feeds the pressure oil continuously through the borings 114 and 117 into the space provided between the portions 109 and 109' of the first-mentioned valve member, and through the boring 119 into the space between the portions 112 and 112' of the second valve member. Moreover, the pressure oil exerts a continuous pressure on the upper smaller face of pistons 110 and 111 and on the smaller right-hand face of piston 118. Channels or borings 149, 150 and 151 are provided for this purpose. Thus, the pistons 110, 111 and 118 are subjected to a continuous pressure tending to return the same to an initial position which is the lower position with pistons 110 and 111 and the left end position with piston 118. It is obvious, of course, that the restoring pressure on these pistons could be inserted by suitable springs instead of by the pressure oil.

The cylinder 135 and the end of cylinder 140 containing the valve member 109 communicate by a duct 137. In addition, the end of cylinder 140 is connected by a passage 139 with the cylinder 141. The piston 112 is provided with an end portion 112'' which is cut off at the top to provide the flat face. This end portion serves to close the conduit 139 when the piston 112 is in its left end position, shown in Fig. 12. The end portion 112'', however, is not adapted to interrupt the communication of the conduits 133 and 139 with a passage 136, when the piston is in its right end position, illustrated in Fig. 10. The exhaust passage 136 opens into the supply tank for the pressure oil.

Similarly, the cylinder 140 is provided with an exhaust duct 145. The operation is as follows:

Fig. 10 illustrates the position of the parts just before the table 2 has returned to initial position. The indexing spindles are locked as the valve member 109 connects the conduit 132 with an exhaust passage 145 so that no pressure will be exerted on the lower face of pistons 110 and 111. Similarly, the valve member 112 does not interrupt the communication of the conduit 133 with the exhaust passage 136 so that the piston 118 is kept in its left end position.

When the return stroke of the table is completed, the inclined cam face 143 provided on the table will engage the rod 58 of the valve member 109 and will push the same towards the left into the position shown in Fig. 12. As a result, the pressure oil is fed from the conduit 114 through the ducts 117, 140, 132 to the lower side of the pistons 110 and 111. These pistons will be lifted and the cam faces 122, 123 will initially release the levers 124 and 125.

On continued movement, the piston rods 120, 121 engage the arms 130, 131 and thus lift the locking levers 127, 128 out of the recesses of the discs 103, 104 which are thus free to turn. In turning, the locking lever 127 shifts the valve member 112 towards the left by means of its extension 116, whereby the pressure fluid is admitted to the left face of piston 118 from tank 114 by way of the ducts 119, 141, 133. As a result, the rack 113 is shifted towards the right and turns the gear 115 in clockwise direction which, by means of the one-way clutch, carries along the change gear 30. The change gears 28 and 29 turn the indexing spindles 26, 27 through an angle which is determined by the ratio of transmission between the gears.

At this point of the cycle of operation, all parts assume the position shown in Fig. 12 in which the turn of the spindles has been completed, whereas the locking levers have not yet arrived in locking position.

The piston 118 has reached a point in which it opens the conduit 137. Therefore, the pressure oil supplied to the duct 133 may act on the left face of piston 109 and move the same into its right end position illustrated in Fig. 10. This connects the conduit 132 with the exhaust passage 145 and permits the pistons 110 and 111 to go down and to operate the levers 124, 125 by means of the cam faces 122, 123. Thus, the locking pawls 127, 128 are firmly wedged into the recesses of the indexing discs to accurately position and secure the same against undesired angular displacements.

The projection 116 of the locking pawl 127 moves the controlling piston 112 towards the right thereby opening the exhaust from the conduits 139 and 133 through the duct 136. This permits the piston 118 to likewise return to its left end position. During this return, the change gear 30 may remain stationary on account of the one-way clutch.

All of the parts have now returned to the position shown in Fig. 10, and are kept therein during the grinding operation in which the table moves forward. The next indexing operation takes place when the table completes its subsequent return stroke.

To give a brief summary of the indexing operation, the latter is as follows:

The table stop 143 moves the valve member 109 to the left and thus releases the pistons 110, 111 serving to keep the pawls 127, 128 in locking position. The second valve member 112 is operated by one of the locking pawls and controls the pressure oil ducts in such a manner as to convey the pressure fluid first to piston 118 performing the indexing turn and, subsequently, through duct 137 to the first-mentioned valve member 109, for restoring the latter to initial position. This causes the pistons 110, 111 to restore and to return the locking pawls to locking position in which they accurately arrest and hold the indexing discs. At the same time, however, the second valve member 112 is restored to initial position by one of the locking pawls and, by means of conduits 133, 136, causes the piston 118 to restore.

Thus, it will appear that a single impulse from the work table is sufficient to automatically and successively effect the steps of releasing, turning, positioning and locking the indexing discs, independently from the speed of the work table, all of the steps being carried out smoothly without any shocks.

The means for positioning and adjusting the work pieces consist of suitable gauges comprising pairs 22, 23 of contacting members, drivers 18, 19 and driving plates 20, 21, all illustrated in Figs. 1, 4, 5 and 6.

Beneath each of the two work pieces 16 and 17 there are mounted on table 2 two brackets 72, 73 carrying a shaft 24, or 24' respectively, and adapted to be adjusted to the desired position and rested therein. The shaft is provided with a handle 25, or 25' respectively, and with two gauging members 22, or 23 respectively. These gauging members are adapted to contact with the work piece and to position the same relative to the grinding discs. For this purpose, the shafts are turned by means of their handles so that the gauging members engage two spline-flanks, as illustrated in Figs. 5 and 7.

The gauging members 23 are employed for adjusting a shaft on which two spline-flanks are to be ground, whereas the gauging members 22 are used for adjusting a shaft of which the bottom is to be ground. In case, both shafts are to be ground at the spline faces only, two gauging members are used as illustrated in Fig. 7. In practical operation, the handle 25 is turned to press the gauging members from below against the spline flanks of the work pieces, as shown in the figures.

The drivers 18, 19 are adapted to be clamped to the ends of the work pieces 16, 17 by means of bolts 77, 78 and to engage a suitable recess in the driving discs 20, 21 by means of a lateral extension 79, 80. The driving discs are loosely rotatable on the spindles 26, 27 and adapted to be attached thereto by means of pairs 64, 65 of bolts which are carried by plates 81, 82 firmly attached on the spindles. The bolts 64, 65 project through arc-shaped slots 83, 84 provided in the driving discs 20, 21. Clamping screws 66, 67 serve to firmly attach the projections 79, 80 of the drivers to the driving discs 20, 21.

For accurately positioning the work pieces relative to the grinding discs, the operator proceeds as follows:

He attaches a driver 18, or 19 respectively, on each work piece 16, or 17 respectively, and positions the latter between the centers of the tailstock and the coordinated work spindles so that the projections 79, 80 of the drivers each engage the recess in the driving discs 20, or 21 respectively. Then the operator tightens the bolts 66, 67 to firmly clamp the projections to the driving discs. During this operation, the driving discs remain loosely rotatable on the work spindles 26, 27. Now, the operator lifts the handles 25, 25' to press the gauging members on pairs of splines, whereby the faces to be ground will be accurately positioned relative to the grinding discs. While the handles 25 are kept operated, the nuts on bolts 64, 65 must be tightened to firmly clamp the driving discs against the plates 81, 82 of the spindles 26, 27.

When the flanks of the one work piece 17 carried by spindle 27, have been ground and when this work piece is to be put on the other spindle 26, the operator may leave the driver in position on the work piece and insert the driver into the other driving disc 20 in which it is firmly clamped in position by the bolt 66. In this manner, the shaft is properly aligned relative to the grinding discs so that the ground faces between the splines may be operated upon. The necessity for any readjustment of the work piece is avoided.

I prefer to employ similar gauging means independently of the machine in combination with a device having two centers and discs similar to discs 20, 21, 81, 82 for the purpose of attaching a driver on a third work piece in accurate position. In this manner, a work piece provided with its driver may be kept in readiness, while two other work pieces are simultaneously operated upon. This will greatly reduce the time required for adjusting operations.

The upper portion of the tailstock 4 is so flattened that, when the table moves towards the left with reference to Fig. 1, the grinding discs and the parts carrying the same will not interfere, as the tailstock will freely pass through beneath the same.

The bed 1 of the machine carries two lateral standards 31, 32, one on each side of the reciprocating table 2 (compare Fig. 2). Each of these standards is provided with vertical guiding means for a carriage 33, or 34 respectively, in which the spindles 35, 36 of the grinding wheels 39, 40, 41 are mounted. Each of these spindles carries a hub 37, or 38 respectively. As shown in Figs. 2 and 5, the hub 38 may be provided with two grinding discs 39, 40 for simultaneously grinding two flanks of the spline-shaft 17.

The other hub 37 is provided with a single grinding disc 41 adapted to operate on the ground between adjacent splines of the work piece. If desired, however, I may provide either hub with two discs, as shown in Fig.

7, for grinding the flanks only. This operation will be preferred if the face between adjacent splines need not be ground. The spindles 35, 36 carrying the grinding discs are driven from a shaft 42 journalled in the bed of the machine by suitable power-transmitting means, such as belts 43, a secondary shaft 44 mounted in the standards 31, 32 and belts 45.

Each grinding carriage 33 or 34 is kept in position by a vertical spindle 46 or 47 which is journalled in the standard 31, or 32 respectively, by suitable thrust-bearings or the like. Each carriage may be advanced in direction towards the work piece or withdrawn from the same by means of a hand-wheel 48, or 49 respectively, which is operatively connected with the spindle 46 or 47 by a shaft 74 and by a pair of bevel gears 203, 204, compare Figs. 1, 14, 17. Automatic means for adjusting the carriages are provided also which will be described later with reference to Figs. 13—21.

Each lateral standard 31 or 32 (Fig. 3) is provided with an inwardly projecting rod 50 extending above the table 2 and carrying a guiding member 51 which is axially shiftable and adapted to be arrested in a suitable position. Each guiding member 51 is provided with a holder 52 mounted for vertical adjustment and carrying a sensing lever 54 pivotally mounted on a stud 53.

The lower arm 55 of the sensing lever has a pointed end adapted to contact with the face of the work piece 16 or 17 which is being ground. The upper arm of the sensing lever controls an auxiliary lever 75 which engages the operating member 76 of a suitable measuring device 56, 57 provided with an indicator. In this manner, the position of the pointed end of the sensing arm 55 on the face to be ground will be indicated by the pointer 60, 61 (Fig. 2). Moreover, the sensing levers serve for automatically disabling the means for advancing the grinding discs in direction towards the work pieces as soon as the desired final dimensions have been attained. This will be described later with reference to Fig. 8.

When the table 2 carrying the work pieces arrives at its left end position, the sensing levers must leave the faces of the work pieces in order that the latter may be turned. If the lower arms of the sensing levers, however, would freely drop upon leaving the faces of the work pieces, before the latter have attained the final dimensions, an electric contact 244 cooperating with the levers and adapted to terminate the advance of the grinding discs, would be opened any time, the table arrives at its left end position. For preventing a permature opening of this contact, a holding magnet 62 or 63 is provided for the sensing levers and is temporarily energized when the table arrives in its left end position. Suitable contacts controlled by the table close and open an electric circuit which energizes the holding magnets and thus holds the sensing levers in their respective positions which they assume at that time.

When the faces of the work piece return below the sensing levers on the return stroke of the table, the circuit is interrupted and the electro-magnets are de-energized so that the sensing levers will drop in contact with the faces. The electric circuit and the contacts controlled by the table have not been illustrated in the drawings as their arrangement is well-known in the art.

With reference to Figs. 1, 2, 3, 8 and 14–21, I shall now proceed with the description of the means for automatically advancing the grinding discs every time, the work pieces have made one complete revolution, and for automatically terminating such an advance when the desired dimensions have been attained.

For the purpose of the automatic advance, I provide a vertical shaft 232 which is journalled in each of the lateral standards 31 or 32 and adapted to be driven by the continuously rotating driving shaft 42. As the spindles carrying the grinding discs must be intermittently advanced a certain extent whenever the work spindles have completed one revolution, I have provided the following arrangement:

The upper end of each of the vertical shafts 232 carries a wheel 233 formed with peripheral teeth (Fig. 8). Each of the lateral standards carries a shaft 205 arranged above and coaxially with the respective shaft 232. An electro-magnet 234 and a pivotal pawl 236 are mounted on the lower end of each shaft 205. The magnet 234 is arranged to attract the pawl 236 when energized, whereby the pawl will engage between the teeth of the wheel 233 and thus clutch the shaft 232 to the shaft 205 for transmitting motion to the latter from the continuously rotating shaft 232. When the magnet is de-energized, the pawl 236 is disengaged from the wheel 233 by a suitable spring (not shown) and the shafts 232 and 205 are disconnected from one another.

On the work spindle 27 of the indexing head 3 a contacting member 237 is mounted which is adapted to get in contact with a stationary member 238 whenever the spindle has completed a revolution. The contact member 238 is mounted in the casing of the indexing head and connected to the one terminal of a source of current 240 by a wire 239. The other terminal is connected by a conductor 241 with the magnet 234 and by a conductor 242 with a stationary contact 243. The latter cooperates with a movable contact 244 attached to the sensing lever 54. The circuit is completed by a wire 245 leading from the pivot 53 of the lever 54 to the rotary contacting member 237, as shown in Fig. 9.

Thus, it will appear that, whenever the spindle 27 has completed a revolution owing to its intermittent turn and has thus likewise turned spindle 26 by way of the change gears, a circuit is temporarily closed which will energize the magnet 234 and attract the pawl 236, whereby motion will be transmitted to the shaft 205 from the shaft 232. The shaft 205 serves to turn the advancing spindles 46, or 47 respectively, in a manner which will be described later with reference to Figs. 1, 14.

However, the connection of shafts 205 and 232 is temporary only and lasts so long as the contacts 243 and 244 close the circuit. When the final dimensions of the work piece have been attained, the sensing lever has been angularly displaced sufficiently to interrupt the circuit between the contacting members 243 and 244. Preferably, contact 243 is adjustable to permit of an accurate setting of the contacts. The interruption of the circuit will automatically discontinue the further advance of the grinding discs.

For the purpose of positively cancelling the condition of connection which has been established between the shafts 205 and 232 by the temporary cooperation of the contacting members 237 and 238, when a certain time has elapsed, e. g. after a complete revolution of the shaft 205, the lower end of pawl 236 carries a follower 246 which cooperates with the inner edge of a cam ring 247 attached to the respective standard 31 or 32 and provided with a recess 248, Fig. 9. When the pawl 236 is attracted by the magnet 234, the follower 246 is moved from the position shown in Fig. 9 in full lines to the position shown in dotted lines and is subsequently taken along by the driver shaft 205. When the circuit is interrupted by the contacts 237, 238, the pawl is positively kept in engagement against the action of its spring by the ring 247 until the follower of the pawl arrives at the recess 248 and enters the same. This position, however, will not be reached until the shaft 205 will have completed one revolution. When the follower under the action of the spring enters the recess, the pawl is disengaged from the toothed wheel 233 and the shaft 205 stops until the circuit will be re-established.

The motion of shaft 205 is transmitted to a ratchet gear 210 through the intermediary of a crank disc 206, a connection rod 207, a pawl-carrier 208 and a pawl 209, as will be seen from Fig. 15. The ratchet gear 210 is operatively connected with the advancing spindle 46 by means of a shaft 211 carrying the ratchet gear 210 and journalled in the respective standard and by means of gears 212 and 213, shown in Fig. 14.

The automatic advance of the grinding discs towards the work piece is performed in such a manner that the advance begins independently of the grinding disc diameter which is subject to reduction by wear and by the truing operations, at the time when the operative grinding face of the grinding discs has arrived at a predetermined distance from the desired final dimension of the work piece. My invention renders it possible to use one and the same mechanism consisting of a few simple gears, ratchet wheels and pawls for advancing the grinding wheels and for compensating the reduction in diameter of the same. This compensation is automatically performed under the control of the final work piece dimensions attained upon each cycle of operation independently of the position of the truing tool, whereby the necessity of manually resetting the grinding wheels after finishing the first work piece is obviated. Moreover, the extent of the advance and of the return stroke to be performed prior to the operation on the subsequent work piece, is limited by stationary adjustable stops. These advantages are secured by the following design:

A ratchet gear adapted to advance the grinding disc a distance including the amount determined by the wear, is detachably clutched with a limiting member movable between settable stops, so that this member disengages the connection when hitting a stop and thus permits of an independent further turn of the ratchet gear corresponding to the wear of the grinding disc, the connection with the limiting member being restored by turning the ratchet gear back. Owing to this connection, the back-turn is limited to the amount determined by the two stops.

The details of this arrangement are shown in Figs. 13–21. To facilitate the comprehension of my invention, I have shown in Fig. 13 the diagrams I–IV illustrating the stepwise advance, if no provisions are made for compensating the wear, whereas the diagram V shows the operation with such provisions. The topline $w$ designates the periphery of the work piece in unfinished condition, the lines $x, y, z, a$ represent the peripheries obtained upon successive grinding steps during the rough grinding. The lines $b, c, d, e, f$ indicate the layers to be removed by the fine grinding steps. $f$ shows the periphery corresponding to the final dimensions of the work piece. Owing to the decrease in diameter of the grinding disc, the effective grinding face would gradually recede and would be located at $a1, a2, a3$, when finishing begins, provided, the advancing shaft were turned back the same amount every time.

The diagrams show that the fine grinding operation on a work piece would continually require more grinding steps than with the previous work piece. With an increasing number of work pieces this will substantially increase the time required for obtaining the desired dimensions.

The means described hereinafter obviate this disadvantage. In Figs. 14–16, I have shown the ratchet 210 intermittently driven from the shaft 205 as described, to be initially connected with the two ratchet gears 214, 215 which are likewise mounted on the shaft 211 journalled in the lateral standards 31, or 32 respectively. The ratchet gears 214 and 215 have opposed peripheral teeth as shown in Fig. 16. Pawls 216, 217 pivotally attached to a plate 218 are adapted to engage these teeth. The plate 218 is loosely mounted on the shaft 211 and carries a pivot pin 219 passing through the pawls 216, 217. Suitable springs (not shown) tend to keep the latter in engagement with the respective teeth. When the ratchet gear 210 is turned in advancing direction, indicated by the arrow 220, it will carry along the plate 218 through action of the ratchet 215 and the pawl 216, until the pawl 216 engages a stationary stop 221, adjustably provided on the respective standard. The stop is provided with an inclined cam face which will rock the pawl so as to disengage it from the respective teeth. When this occurs, the advancing shaft is in a position in which the final dimensions of the work piece have nearly been obtained. If, however, this should not be the case, because of the wear of the grinding disc, the shaft 205 continues its intermittent rotation owing to a repeated closure of the contacts 243, 244, (Fig. 8) and carries along the ratchets 214, 215 which are free to turn because of the disengagement of pawl 216 and because the pawl 217 is riding over its coordinated teeth. The stop 221, however, keeps the pawl 216 in its position and thus prevents the plate 218 from turning.

The advancing shaft 46 and the ratchets 214, 215 are kept on to be intermittently turned until the interruption of the electric circuit will stop the shaft 205, when the final dimensions have been attained.

All the operator has to do before starting the operation on a new work piece, is to bring a stop 222 (Fig. 16) adjustably attached to the standard into position required to permit of turning back shaft 46 sufficiently for withdrawing the grinding discs from operating position the necessary extent. Then, the operator turns back the shaft 46 by manipulation of the hand wheel 48, or 49 respectively. Due to the action of the parts 203, 204, 46, 213 and 212, this will turn the shaft 211, the ratchet 215 and the pawl-carrying plate 218 in rearward direction until the pawl 217 abuts against the stop 222. This makes sure that the grinding disc has been withdrawn the very distance which is required for the subsequent operation and not a larger distance. The axis of the grinding shaft is automatically placed so much closer to the work piece as corresponds to the decrease in diameter in the preceding operation. This means, that the effective grinding face will be positioned at the same distance $f$ from the final dimension of the work piece, as it was initially in the preceding cycle.

In Figs. 17–19 I have shown another embodiment differing from the one just described by additional means which permit of an initial rough advance and, from a certain point, of a fine advance, the latter beginning invariably when the effective grinding face has arrived at a predetermined distance from the final dimension. The same reference numerals are used to designate the similar parts.

The shaft 211 mounted in the standard 31, or 32 respectively as described, has an arm 223 carrying a curved plate 224 which partly covers the teeth of the ratchet gear 210 and extends along the periphery of the latter. A turn of the arm 223 in anticlockwise direction, indicated by arrow 220, is interposing the cover plate 224 between the ratchet 210 and the pawl 209, to the effect, that the pawl will no longer turn the ratchet wheel 210 through the extent of eight teeth, as before, but will turn the ratchet wheel only a smaller number of teeth, say 7, 6, 5 or down to 1.

Thus, the position of the arm 223 determines the step which the grinding disc is advanced by one revolution of shaft 205.

I have provided means which will automatically turn the arm 223 so as to limit the extent of the step-wise advance and to change over at a predetermined time from rough grinding to fine grinding.

These automatic means comprise cams 225 cooperatively connected with the plate 218, for instance carried by said plate, and cooperating with a follower 229 carried by a lever 227, which is journalled between its ends to a pivot 226 attached to the standard 31 or 32.

The other end of the lever is linked to a connection rod 228 pivoted to the arm 223.

The operation is as follows:

At the beginning of the operation, the follower 229 bears on a concentrical portion 230 of the cam (Fig. 19). Therefore, the intermittent turn of the parts 210, 215, 214, 218 will not affect the arm 223. Therefore, the entire stroke of pawl 209 will be effective and the grinding wheel is advanced the distance corresponding to eight teeth. This distance is indicated in Fig. 13, diagram V, by the lines $w, y, z$.

The cam partakes an intermittent turn of the shaft 211. Therefore, it will arrive in the position indicated in Fig. 18, in which the follower rides on the portion 231 of the cam and thus begins to shift the cover plate 224 in anti-clockwise direction. Owing to suitably profiling of the cam, the pawl 209 will turn the disc 210 a gradually decreasing number of teeth, whereby the machine gradually changes over from rough grinding to fine grinding, as indicated in the diagram V by the lines z1, z2, z3, z4.

Subsequently, the follower will ride on the concentrical portion 225 of the cam, as shown in Fig. 19, and will keep the cover plate 224 in the position required for fine grinding. The stepwise advance so obtained is indicated in diagram V by the lines a, b, c, d, e, f.

Upon a number of fine grinding cuts which is predetermined by the profile of the cam, the pawl 216 abuts against the stop 221 thereby and is lifted out of engagement, whereby the plate 218 is stopped.

However, the intermittent fine grinding advance continues the small extent determined by the wear of the grinding disc, until the shaft 205 is automatically disabled by action of the sensing lever, when the desired dimension has been attained.

This operation makes sure that the axis of the grinding disc is advanced towards the work piece the extent determined by the wear. When the parts 48, 74, 203, 204, 46, 213, 212, 211, 214, 215 have been turned in clockwise direction until the pawl 217 is in engagement with the stop 222 limiting the return movement, a condition is established in which in the subsequent cycle of operation the effective grinding face will be spaced from the final dimension of the work piece exactly the same distance as before. Without the special provisions described heretofore, and with an invariable back-turn of the advancing shaft, the beginning of the fine grinding advance would gradually recede more and more into the zone of the rough grinding advance, as illustrated by the diagrams I, II, III, IV, V.

The specific construction shown is capable of a number of modifications. Figs. 20 and 21 illustrate an arrangement in which the ratchet wheels on shaft 211 have been replaced by two friction discs 250, 251 which are pressed by a spring 252 on an interposed plate 253 which is loosely mounted on shaft 211 and performs the same function as the plate 218, in the embodiment shown in Figs. 14–19. The plate 253 carries an adjustable stop 254 adapted to abut against a stationary stop 221 when the plate 253 is carried along with shaft 211. All of the other parts are similar, and perform the same function as the corresponding parts in the described embodiment. For this reason, they have been designated with the same reference numerals. In Fig. 20 on the right-hand side, the electromagnetic clutch is shown which serves for connecting the shafts 232 and 205, as described heretofore.

I have mentioned before that the motion of table 2 is automatically reversed under the control of pressure fluid, such as oil. Figs. 1 and 22–28 illustrate the arrangement provided for this purpose. This arrangement differs from the prior art by the use of a single valve member which is rotatable and axially slidable. This valve member is turned by the stops 9 and 10 (Fig. 1) of the table and, in consequence of this turn, performs an axial movement in the one or the other direction which effects the reversal of the table motion. More particularly, the turn of the rotary valve member will connect and disconnect suitable oil ducts which alternatively conduct the pressure oil to the one or the other end face of the slide valve and thus control the axial movements thereof. By the axial displacement consequent to the turn, the valve member controls again conduits which effect the reversal of the piston 5 (Fig. 1). In this manner, I make sure that the table will not be stopped in its dead-center positions and that the reversal will take place at predetermined points within very narrow limits, all this being effected by simple means comprising but a single valve member.

If desired, of course, I may arrange the valve member so that it is axially displaced by the table and, due to this displacement, is turned to effect the reversal of the piston 5.

A housing including the valve member 6 is rigidly mounted in the bed of the machine. The oil supplied by the pump 7 is conducted through a conduit 8 and through two branch conduits 310, 318 to three ports provided in the housing and opening at the lower side of the valve member, compare Figs. 22 and 23.

The pressure liquid, such as oil, is returned to its supply tank 14 through a pipe 13 having three branches 314, 317 and 320. The pipe 13 and its three branches start from two pairs of ports provided in the valve housing laterally of the valve member, one pair on either side, as shown in Figs. 22 and 23. Two conduits 11 and 12 lead from ports axially spaced in the upper portion of the housing to both ends of the operating cylinder 68 in which the piston 5 is guided which is attached to the bed. A number of borings or conduits are provided within the valve member and will be described in the course of the following explanation of the operation. Figs. 23, 25 and 24 illustrate a position in which the piston 5 moves towards the left as the valve member is kept in its right-hand position with reference to Fig. 23 or in its front position with reference to Fig. 22. The pressure liquid is conducted through the conduit 8 and borings 304, 305 in the valve member to the conduit 12 and thus operates on the right-hand face of piston 5. From the left-hand end of cylinder 68, the oil returns through conduit 11, a boring 308 in the valve member and the conduit 13 to the tank 14.

At the same time, the pressure liquid has access through the port 310 and an axial groove 311 in the valve member to the rear face of the latter, whereas the space confined in the housing by the front face of the valve member, communicates with the exhaust conduit 13 through an axial groove 313 in the valve member and the port 314 in the housing.

Two further axial grooves 312 and 315 are provided in the valve member at points angularly displaced relative to the grooves 311 and 313. In the position shown in Figs. 23, 24 and 25, these additional grooves do not communicate with any ports in the housing.

Just before the piston 5 arrives at its left end position, the stop 10 of the table 2 engages an arm 321 attached to the valve member 6 and turns the same. This turn brings the valve member in a position in which the groove 311 is closed, while the groove 312 gets in communication with the exhaust port 317, as shown in Fig. 26. Moreover, the groove 313 is closed while the groove 315 is registered with the inlet port 318. Therefore, the pressure oil flows through the port 318 and the groove 315 into the space confined in the housing by the front face of the valve member and drives the latter towards its rear end position, shown in Fig. 26. During this movement, the oil may escape from behind the valve member through the groove 312 and the port 317. When the valve member arrives in its new position, it reverses the action of the pressure oil on the piston 5. The oil will flow through 8, 304, 322, 11 to the left end of cylinder 68, while the oil escapes from the other end of cylinder 68 through the ducts 12, 319 and 320 and returns to the tank 14.

Upon the return stroke of the table, the stop 9 will engage the arm 321 and restore the same to the position shown in Fig. 24, whereby a new reversal will be initiated in the manner described.

A comparison of Figs. 24 and 27 will show that the borings 305 and 322 and the grooves 308, or 319 respectively, are angularly displaced relative to each other by the angle through which the arm 321 is turned. These borings and grooves are arranged in different planes perpendicular to the axis of the valve member. With reference to the pressure liquid control of the indexing head, shown diagrammatically in Figs. 10 and 12, I have illustrated a practical construction thereof in Figs. 29-31. A detailed description of these figures, however, seems dispensable herewith, as the operation of the construction shown will be understood from the explanations given with reference to Figs. 10 and 12.

I may mention, however, that the motion of stop 143 attached to the reciprocatory bed of the machine is transmitted to a roller 152 carried by a vertical rack 153 which is guided within a gear box 159 attached to the casing 3 of the indexing head. A pinion 154 in mesh with the rack is journalled in the gear box 159 and transmits the motion to the horizontal piston rod 58 which is horizontally guided in the gear box and rigidly attached to the piston 109. The piston rod extends transversely through the casing 3 and carries a knob 155 on its end.

By manipulation of this knob, the indexing gearing may be operated by hand. A collar 156 on the piston rod 58 cooperates with a cover 157 on the casing 3 to limit the stroke of the piston 109. The cylinders 140 and 141 are provided in a cylindrical member 158 which is inserted in a suitable ear of the casing 3 and clamped in position by bolts 160. Similarly, the cylinders 146 and 147 are formed by a cylindrical member 161 (Fig. 31) which is likewise inserted in a suitable opening of casing 3 and serves at the same time for guiding the piston rods 120, 121.

The construction described is capable of many modifications and some parts thereof may be used without the others, without departing from the scope of my invention.

What I claim is:—

1. In a grinding machine for simultaneously grinding two spline-shafts, the combination comprising a table, an indexing head mounted thereon, two parallel work-carrying spindles journalled in said head, means for positively connecting said spindles for common and simultaneous turns, means for intermittently effecting a turn of said spindles, and two shafts each carrying a grinding disc and extending perpendicularly to said spindles, said grinding disc-carrying spindles and said work-carrying spindles being mounted for relative reciprocatory movement in the direction of said latter spindles.

2. In a grinding machine for simultaneously grinding two spline-shafts, the combination comprising a table, an indexing head mounted thereon, two parallel work-carrying spindles, journalled in said head, means for positively connecting said spindles for common and simultaneous turns, locking pawls adapted to lock said spindles, fluid-controlled means for intermittently effecting a turn of said spindles, two shafts each carrying a grinding disc and extending perpendicularly to said spindles, said grinding disc-carrying spindles and said work-carrying spindles being mounted for relative reciprocatory movement in the direction of said latter spindles, said fluid-controlled means comprising pistons adapted to control said locking pawls, an auxiliary piston adapted to turn said spindles, two slide valves, one being adapted to be operated in response to said reciprocatory movement and to control said pistons and the other being operatively connected to one of said pawls and adapted to control said auxiliary piston, and a conduit controlled by said auxiliary piston and connected to the space accommodating said first-mentioned slide valve, whereby the first-mentioned slide valve will first cause the locking pawls to be released and to operate the second slide valve for effecting the turn of the spindles by action of said auxiliary piston, whereupon the latter causes the first-mentioned slide valve to be restored by pressure fluid flowing through said conduit.

3. In a grinding machine for simultaneously grinding two spline-shafts, the combination comprising a table, an indexing head mounted thereon, two parallel work-carrying spindles, journalled in said head, means for positively connecting said spindles for common and simultaneous turns, locking pawls adapted to lock said spindles, fluid-controlled means for intermittently effecting a turn of said spindles, two shafts each carrying a grinding disc and extending perpendicularly to said spindles, said grinding disc-carrying spindles and said work-carrying spindles being mounted for relative reciprocatory movement in the direction of said latter spindles, said fluid-controlled means comprising pistons adapted to control said locking pawls, a cylinder, an auxiliary piston guided therein and adapted to turn said spindles, two slide-valves, one being adapted to be operated in response to said reciprocatory movement and to control said pistons and the other being operatively connected to one of said pawls and adapted to control said auxiliary piston, a conduit controlled by said auxiliary piston and connected to the space accommodating said first-mentioned slide valve, and an exhaust conduit connected with said cylinder and adapted to be controlled by said second slide valve, whereby the first-mentioned slide valve will first cause the locking pawls to be released and to operate the second slide valve for effecting the turn of the spindles by action of said auxiliary piston whereupon the latter causes the first-mentioned slide valve to be restored by pressure fluid flowing through said conduit to initial position in which it opens said exhaust conduit for restoration of said auxiliary piston and controls said piston to bring said pawls in locking position.

4. In a grinding machine for simultaneously grinding two spline-shafts, the combination comprising a table, an indexing head mounted thereon, two parallel work-carrying spindles, journalled in said head, means for positively connecting said spindles for common and simultaneous turns, locking pawls adapted to lock said spindles, fluid-controlled means for intermittently effecting a turn of said spindles, two shafts each carrying a grinding disc and extending perpendicularly to said spindles, said grinding disc-carrying spindles and said work-carrying spindles being mounted for relative reciprocatory movement in the direction of said latter spindles, said fluid-controlled means comprising pistons adapted to control said locking pawls, a cylinder, an auxiliary piston guided therein and adapted to turn said spindles, two slide-valves, one being adapted to be operated in response to said reciprocatory movement and to control said pistons and the other being operatively connected to one of said pawls and adapted to control said auxiliary pawls and adapted to control said auxiliary piston, a conduit controlled by said auxiliary piston and connected to the space accommodating said first-mentioned slide valve, an exhaust conduit connected with said cylinder and adapted to be controlled by said second slide valve, and a relief conduit controlled by said second slide valve and connected to the space accommodating the first-mentioned slide valve thereof to permit of the operation of the latter in response to said reciprocatory movement, whereby the first-mentioned slide valve will first cause the locking pawls to be released and to operate the second slide valve for effecting the turn of the spindles by action of said auxiliary piston whereupon the latter causes the first-mentioned slide valve to be restored by pressure fluid flowing through said conduit to initial position in which it opens said exhaust conduit for restoration of said auxiliary piston and controls said piston to bring said pawls in locking position.

5. The combination set forth in claim 2, in which said pistons are connected with cam members adapted to cooperate with said locking pawls for wedging the same in locking position or for withdrawing the same from locking position.

6. In a grinding machine for grinding spline-shafts, the combination comprising a table, an indexing head mounted thereon, parallel work-carrying spindles journalled in said head, means for positively connecting said spindles for common and simultaneous turns, fluid-controlled means for intermittently effecting a turn of said spindles, slides movable towards and away from the axes of said spindles, a grinding disc carried by each slide, said slides and said spindles being mounted for relative reciprocatory movement in the direction of said spindles, a threaded spindle coordinated to each slide to move the same, a continually rotating shaft, a clutch for cooperatively connecting said shaft with said threaded spindle, means for disengaging said clutch upon a predetermined turn, and electric means coordinated to one of said spindles and to said clutch for engaging the same, whenever said spindles have completed one revolution, whereby the grinding discs will be automatically and intermittently advanced towards the work pieces whenever the latter have completed one revolution.

7. In a grinding machine for grinding spline-shafts, the combination comprising a table, an indexing head mounted thereon, parallel work-carrying spindles journalled in said head, means for positively connecting said spindles for common and simultaneous turns, means for intermittenly effecting a turn of said spindles, slides movable towards and away from the axes of said spindles, a grinding disc carried by each slide, said slides and said spindles being mounted for relative reciprocatory movement in the direction of said spindles, a rotary member cooperatively connected with each slide to advance the same towards the axis of the respective spindle, and element so connected to said rotary member as to tend to participate in the turns thereof, two adjustable stops limiting the turns of said element without interfering with the advancing turn of said rotary member, means for driving said rotary member to advance the slide towards the work piece a distance composed of the amount of cut and the amount of wear of said grinding disc, and means for returning said rotary member to a position in which said element abuts against one of said stops, whereby the slide may be advanced towards the work piece a distance which exceeds the return movement of the slide from the work piece by an amount which corresponds to the reduction in diameter of the grinding disc.

8. The combination set forth in claim 7, in which said rotary member carries two ratchet wheels having opposed teeth, and in which said element carries two pawls, each engaging one of said ratchet wheels and adapted to abut against the adjustable stops, one of the latter being operative to lift the abutting pawl from engagement with its ratchet wheel, whereby interference of the abutting pawl with the continued advancing turn of the rotary member is obviated.

9. The combination set forth in claim 7, in which said rotary member and said element are connected to each other by frictional engagement, whereby the rotary member may continue its advancing turn when one of the adjustable stops has limited the turn of said element.

10. In a grinding machine for grinding spline-shafts, the combination comprising a table, an indexing head mounted thereon, parallel work-carrying spindles journalled in said head, means for positively connecting said spindles for common and simultaneous turns, means for intermittently effecting a turn of said spindles, slides movable towards and away from the axes of said spindles, a grinding disc carried by each slide, said slides and said spindles being mounted for relative reciprocatory movement in the direction of said spindles, a rotary member cooperatively connected with each slide to advance the same towards the axis of the respective spindle, an element so connected to said rotary member as to tend to participate in the turns thereof, two adjustable stops limiting the turns of said element without interfering with the advancing turn of said rotary member, a ratchet wheel attached to said rotary member, a reciprocatory pawl engaging said ratchet wheel to impart a stepwise turn to said rotary member for intermittently advancing the slide towards the work piece, governing means for altering the effective stroke of said pawl, a cam cooperatively connected to said element and adapted to control said governing means so as to gradually decrease the effective stroke of said pawl as the advance of the slide proceeds, and means for returning said rotary member to a position in which said element abuts against one of said stops, whereby the slide may be advanced towards the work piece a distance which exceeds the return movement of the slide from the work piece by an amount which corresponds to the reduction in diameter of the grinding disc.

11. In a grinding machine for simultaneously grinding two spline-shafts, a reciprocatory work table, an indexing head mounted thereon, two work-carrying spindles journalled in said head parallel to the reciprocatory motion of said table, gears positively connecting said spindles for common and simultaneous turns, means for intermittently effecting a turn of said spindles, a slide for each spindle movable towards and away from the axis thereof and carrying a grinding disc, a ratchet wheel for effecting the onward movement of said slide, a reciprocatory pawl for intermittently turning said ratchet wheel, a cover plate coextensive with the periphery of said ratchet wheel to determine the effective stroke of said pawl, a rotary cam adapted to control said cover plate for gradually reducing the effective stroke of said pawl, stops for limiting the turn of said cam in either direction, means for connecting said cam to said ratchet wheel and including pawls cooperating with said stops so as to permit said ratchet wheel to continue its slide-advancing turn after said cam has been held stationary by said stops, and means for returning said ratchet wheel and said cam until the latter is held stationary by one of said stops, whereby the grinding disc will be intermittently advanced with gradually decreasing steps towards the work piece and, subsequently, is returned through a distance which differs from the advance by the amount of the reduction in diameter of the grinding disc.

12. The combination set forth in claim 1, in which gauging members are mounted on said table beneath, and movable towards, the axes of said spindles, a handle being connected to said gauging members, the latter being adapted to engage symmetrical splines on the work piece for properly positioning the same relative to the grinding discs.

13. In a grinding machine for grinding spline-shafts, the combination comprising a table, an indexing head mounted thereon, parallel work-carrying spindles journalled in said head, means for positively connecting said spindles for common and simultaneous turns, means for intermittently effecting a turn of said spindles, slides movable towards and away from the axes of said spindles, a grinding disc carried by each slide, said slides and said spindles being mounted for relative reciprocatory movement in the direction of said spindles, driving means for intermittently advancing said slides towards the axes of said spindles, indicators, and sensing levers, one for each spindle and adapted to contact with the work piece carried thereby and to disable said driving means when the desired final dimension of the work piece has been attained, an operative connection being provided between said sensing levers and said indicators, whereby the dimensions of the work pieces will be indicated at any time.

14. The combination set forth in claim 13, in which electro-magnets are arranged adjacent to said sensing levers and adapted to frictionally hold the same in position, when the sensing levers arrive out of engagement with the work pieces owing to said reciprocatory movement.

15. In a grinding machine for grinding spline-shafts, the combination comprising a bed, a reciprocatory table guided thereon, an indexing head mounted on said table, work-carrying spindles journalled in said head and extending parallel to said bed, means for positively connecting said spindles for common and simultaneous turns, slides carrying grinding discs and mounted on said bed to be movable towards and away from the axes of said spindles, a cylinder mounted in said bed, a piston guided therein and connected to said table, a source of pressure fluid, conduits connecting the same with said cylinder, a single rotary slide valve inserted in and controlling said conduits for effecting a reversal of said piston, said valve being mounted in said bed for angular displacement and for longitudinal displacement, stops carried by said table and adapted to engage said slide valve, to effect one of said displacements, and auxiliary conduits connected to said source of pressure fluid and to the space accommodating said valve and controlled by the latter for effecting the other displacement in response to the displacement effected by said stops, whereby said valve is operative to reverse the table in a predetermined position within narrow limits and to prevent the bed from remaining in one of its dead-center positions.

16. In a grinding machine for grinding spline-shafts, the combination comprising a bed, a reciprocatory table guided thereon, an indexing head mounted on said table, work-carrying spindles journalled in said head and extending parallel to said bed, means for positively connecting said spindles for common and simultaneous turns, slides carrying grinding discs and mounted on said bed to be movable towards and away from the axes of said spindles, a cylinder mounted in said bed, a piston guided therein and connected to said table, a source of pressure fluid, conduits connecting the same with said cylinder, a single rotary slide valve inserted in and controlling said conduits for effecting a reversal of said piston, said valve being mounted in said bed for angular displacement and for longitudinal displacement, stops carried by said table and adapted to engage said slide valve to effect said angular displacement of the valve, and auxiliary conduits connected to said source of pressure fluid and to the space accommodating said valve and controlled by the latter for effecting the longitudinal displacement in response to the displacement effected by said stops, said valve being of cylindrical shape and having axial grooves communicating with ports connected to said source for conducting the pressure fluid to the one or the other end face of said valve depending on its angular position, whereby said valve is operative to reverse the table in a predetermined position within narrow limits and to prevent the bed from remaining in one of its dead-center positions.

In testimony whereof I have affixed my signature.

CLAUS JUNGE.